United States Patent
Hesselbarth et al.

(10) Patent No.: US 11,186,520 B2
(45) Date of Patent: Nov. 30, 2021

(54) PLASTICIZER FOR GEOPOLYMERS

(71) Applicant: SIKA TECHNOLOGY AG, Baar (CH)

(72) Inventors: Daniela Hesselbarth, Zürich (CH); Thomas Moser, Zürich (CH); Tugba Turan, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 16/334,317

(22) PCT Filed: Oct. 5, 2017

(86) PCT No.: PCT/EP2017/075426
§ 371 (c)(1),
(2) Date: Mar. 18, 2019

(87) PCT Pub. No.: WO2018/069165
PCT Pub. Date: Apr. 19, 2018

(65) Prior Publication Data
US 2019/0202737 A1   Jul. 4, 2019

(30) Foreign Application Priority Data

Oct. 13, 2016 (EP) .................................. 16193805

(51) Int. Cl.
| | | |
|---|---|---|
| C04B 24/00 | (2006.01) |
| C04B 28/26 | (2006.01) |
| C04B 24/26 | (2006.01) |
| C04B 14/10 | (2006.01) |
| C04B 18/08 | (2006.01) |
| C04B 18/14 | (2006.01) |
| C04B 28/00 | (2006.01) |
| C04B 40/00 | (2006.01) |
| C04B 103/30 | (2006.01) |

(52) U.S. Cl.
CPC .......... *C04B 28/006* (2013.01); *C04B 14/106* (2013.01); *C04B 18/08* (2013.01); *C04B 18/141* (2013.01); *C04B 24/2641* (2013.01); *C04B 28/26* (2013.01); *C04B 40/0039* (2013.01); *C04B 2103/30* (2013.01); *Y02P 40/10* (2015.11); *Y02W 30/91* (2015.05)

(58) Field of Classification Search
CPC ......... C04B 28/00; C04B 28/26; C04B 24/26; C04B 14/10; C04B 18/08; C04B 18/1814

USPC ........................................................ 524/442
See application file for complete search history.

(56) References Cited

U.S. PATENT DOCUMENTS

| | | | |
|---|---|---|---|
| 4,897,119 A | 1/1990 | Clarke | |
| 2006/0266977 A1* | 11/2006 | Dubois-Brugger | C04B 24/2647 252/79.1 |
| 2010/0010139 A1* | 1/2010 | Davidovits | C04B 28/006 524/444 |
| 2012/0192765 A1* | 8/2012 | Huynh | C04B 28/006 106/632 |
| 2013/0284069 A1* | 10/2013 | Dubey | C04B 7/32 106/695 |

FOREIGN PATENT DOCUMENTS

| | | |
|---|---|---|
| CN | 103896512 A | 7/2014 |
| CN | 104098282 A | 10/2014 |
| CN | 105 218 004 A | 1/2016 |
| CN | 105 272 127 A | 1/2016 |
| CN | 105254822 A | 1/2016 |
| FR | 2 935 698 A1 | 3/2010 |
| JP | H08-301637 A | 11/1996 |
| JP | H10-120456 A | 5/1998 |
| WO | 2010/079414 A2 | 7/2010 |
| WO | 2011/072784 A1 | 6/2011 |
| WO | 2015/049010 A1 | 4/2015 |

OTHER PUBLICATIONS

Nematollahi et al., "Effect of different superplasticizers and activator combinations on workability and strength of fly ash based geopolymer," Materials and Design, 2014, vol. 57, pp. 667-672.
Dec. 15, 2017 International Search Report issued in International Patent Application No. PCT/EP2017/075426.
Apr. 16, 2019 International Preliminary Report on Patentability issued in International Patent Application No. PCT/EP2017/075426.

\* cited by examiner

*Primary Examiner* — Deve V Hall
(74) *Attorney, Agent, or Firm* — Oliff PLC

(57) ABSTRACT

The use of an additive, including at least one water-soluble polymer, which is a homo-or copolymer of at least one monoethylenically unsaturated carboxylic acid, and optionally at least one alkali silicate as a liquefier for geopolymers. The additive can be produced in a simple and inexpensive manner and is particularly suitable for liquefying geopolymers, in particular geopolymers containing metakaolin.

10 Claims, No Drawings

PLASTICIZER FOR GEOPOLYMERS

TECHNICAL FIELD

The invention relates to the field of geopolymers and of plasticizers for geopolymers.

PRIOR ART

Geopolymers are known as an alternative to cement-based building materials. Geopolymers are considered to be environmentally friendly building materials since the production of their starting materials gives rise to much less $CO_2$ than the production of portland cement. Building materials containing geopolymers as binders, in the hardened state, usually have better chemical stability and better thermal stability than building materials based on portland cement. Geopolymers generally consist of an aluminum silicate component and an alkali metal silicate component that react with one another in a geopolymerization reaction. Aluminum silicate components used include fly ash, slag and metakaolin.

However, geopolymers are often difficult to process, especially when they contain metakaolin. Geopolymers having a high solids content, or a small amount of water, are very viscous and often sticky, and hence difficult to process. Although an increased amount of water improves processibility, it has an adverse effect on strength and durability after hardening. Since no water is consumed in the geopolymerization reaction, unlike in the case of hydraulic binders such as cement, for example, the water which is required for processing is for the most part still present after the hardening and, after the shaped body has dried out, leaves pores that reduce the strength and durability of the shaped body.

In order to obtain geopolymers having high strength and durability, it is therefore vital to keep the amount of water to a minimum in the course of processing, which is facilitated by the use of a good plasticizer. Owing to the high pH of more than 13, however, the selection of suitable plasticizers for geopolymers and the effect thereof is limited.

US 2012/0192765 describes specific geopolymer cements which may contain a crosslinked polyacrylic acid. Crosslinked polyacrylic acids typically increase the viscosity of a solution. No plasticizing effect of the crosslinked polyacrylic acid is shown.

WO 2010/079414 describes geopolymers comprising, as plasticizer, known plasticizers for portland cement-based concrete mixtures. However, plasticizers of this kind do not adequately plasticize geopolymers.

WO 2011/072784 describes geopolymer compositions comprising a carbohydrate as water-reducing agent. But carbohydrates can significantly retard the setting of the geopolymer.

WO 2015/049010 describes geopolymer compositions comprising, inter alia, an organic acid, preferably tartaric acid. Plasticizers used are polycarboxylate ethers (PCEs). But polycarboxylate ethers are costly, and tartaric acid significantly retards the setting of the geopolymer.

Nematollahi and Sanjayan, Materials and Design 57 (2014), pages 667-672, describe the use of polycarboxylate ethers (PCEs), sulfonated naphthalene condensates and melamine condensates as plasticizer for fly ash-based geopolymers.

There is still a need for a robust and inexpensive plasticizer for geopolymers, specifically for geopolymers containing metakaolin, that overcomes the disadvantages of the prior art.

SUMMARY OF THE INVENTION

It is an object of the present invention to provide an effective plasticizer for geopolymers that enables easy processibility for a long period without too significantly retarding the hardening or reducing the final strength to an undesirable degree.

This object is surprisingly achieved by the use of an additive A as described in claim 1. The additive A comprises at least one water-soluble polymer which is a homo- or copolymer of at least one monoethylenically unsaturated carboxylic acid that has been partly or fully neutralized with an alkali metal ion. A polymer of this kind is of excellent suitability for plasticization of geopolymers. At the same time, it improves the flow characteristics of geopolymers and also has the result that they remain processible over a longer period of time. The combination with an alkali metal silicate can distinctly increase the plasticizing effect of the water-soluble polymer, giving geopolymers of high strength. Both the water-soluble polymer and the alkali metal silicate are commercially readily available and inexpensive.

Particularly geopolymers containing metakaolin are difficult to process and usually sticky. Surprisingly, the additive A of the invention is of a very good suitability for plasticization of metakaolin-containing geopolymers.

Further aspects of the invention form the subject matter of further independent claims. Particularly preferred embodiments of the invention form the subject matter of the dependent claims.

Ways of executing the invention

The invention provides for the use of an additive A comprising at least one water-soluble polymer which is a homo- or copolymer of at least one monoethylenically unsaturated carboxylic acid that has been partly or fully neutralized with an alkali metal ion, and optionally an alkali metal silicate $S_1$, as plasticizer for geopolymers.

A "water-soluble polymer" in the present document is understood to mean a polymer which, at 20° C. under standard pressure and at least one pH from the group of 2, 7 and 12, has a solubility of at least 10 g per liter of water. Preferred water-soluble polymers under these conditions have a solubility of 100 g per liter of water.

A "monoethylenically unsaturated" organic compound refers to one that has just one polymerizable carbon-carbon double bond.

"Molecular weight" is understood in the present document to mean the molar mass (in grams per mole) of a molecule. "Average molecular weight" refers to the weight-average $M_w$ or number-average $M_n$ of an oligomeric or polymeric mixture of molecules. It is determined by means of gel permeation chromatography (GPC).

The additive A of the invention comprises at least one water-soluble polymer which is a homo- or copolymer of at least one monoethylenically unsaturated carboxylic acid that has been partly or fully neutralized with an alkali metal ion. A polymer of this kind is obtainable by homo- or copolymerization of at least one monoethylenically unsaturated carboxylic acid. The monoethylenically unsaturated carboxylic acid here may be in the form of the free acid or of an alkali metal or alkaline earth metal salt, and the polymer, if the monoethylenically unsaturated carboxylic acid was in the form of the free acid, is subsequently partly or fully neutralized. In the case of a copolymer, the monoethylenically unsaturated carboxylic acid may have been polymerized with other unsaturated carboxylic acids and/or with other polymerizable, monoethylenically unsaturated monomers. Unsaturated carboxylic acids suitable for the purpose are especially acrylic acid, methacrylic acid, maleic acid, maleic anhydride, fumaric acid, crotonic acid or itaconic acid. Suitable polymerizable, monoethylenically unsaturated monomers are especially allyl alcohol, ethylene, propylene, vinylsulfonic acid, methallylsulfonic acid, acrylamido-2-methylpropanesulfonic acid, acrylamide, alkyl esters of methacrylic acid or hydroxyalkyl esters of methacrylic acid.

The water-soluble polymer is especially a linear or branched polymer that has not been crosslinked. The water-soluble polymer is preferably a linear polymer. The water-soluble polymer is especially preparable by free-radical polymerization. Initiators suitable for the purpose are especially peroxides, hydroperoxides, persulfates or azo initiators. The free-radical polymerization here is preferably conducted under conditions that control the molecular weight, especially by addition of mercaptans, alkali metal sulfite, alkali metal phosphite or alkali metal hypophosphite.

Preference is given to a water-soluble polymer which is a homo- or copolymer of at least one monoethylenically unsaturated carboxylic acid from a free-radical polymerization in water in the presence of alkali metal sulfite or alkali metal hypophosphite.

The water-soluble polymer may also have been prepared by means of "living" free-radical polymerization.

Preferably, the water-soluble polymer is a homo- or copolymer of acrylic acid, especially a homopolymer of acrylic acid or a copolymer of acrylic acid and methacrylic acid or a copolymer of acrylic acid and maleic acid. More preferably, the water-soluble polymer is polyacrylic acid or a copolymer of acrylic acid and maleic acid.

Most preferably, the water-soluble polymer is polyacrylic acid. Polyacrylic acid is readily available and inexpensive and shows a particularly good effect as a plasticizer.

The water-soluble polymer preferably has an average molecular weight $M_w$ in the range from 1'000 to 20'000 g/mol, more preferably 1'000 to 10'000 g/mol, especially 2'000 to 8'000 g/mol. Such polymers show a good effect as plasticizers without having too severe an adverse effect on the processibility, hardening or compressive strength of the geopolymer. Polymers having higher or lower molecular weights worsen processibility and/or reduce compressive strength in an undesirable manner. Polymers having lower molecular weights additionally show inadequate plasticizing action and/or retard the hardening of the geopolymer to an undesirable degree.

Preferably 20% to 100%, more preferably 50% to 100%, especially 80% to 100%, of the acid groups of the water-soluble polymer have been neutralized. Such a polymer can be mixed particularly well with the geopolymer, especially without flocculation or gel formation.

Neutralization is especially effected with a sodium hydroxide and/or a potassium hydroxide. In a preferred embodiment, the water-soluble polymer is a sodium or potassium salt of polyacrylic acid, preferably a sodium salt. In a further preferred embodiment, the water-soluble polymer is a sodium or potassium salt of a copolymer of acrylic acid and methacrylic acid, preferably a sodium salt.

In a further preferred embodiment, the water-soluble polymer is a sodium or potassium salt of a copolymer of acrylic acid and maleic acid, preferably a sodium salt.

Suitable water-soluble polymers are commercially available, especially Sokalan® CP or Sokalan® PA products from BASF.

In a particularly preferred embodiment, the water-soluble polymer is a homopolymer of acrylic acid in the form of the sodium salt and having an average molecular weight $M_w$ in the range from 2'000 to 8'000 g/mol.

The additive A is used as plasticizer for geopolymers. For this purpose, it is preferably used in such an amount that the water-soluble polymer is present in an amount of 1 to 10 parts by weight, preferably 1.1 to 8 parts by weight, more preferably 1.2 to 5 parts by weight, calculated in solid form, to 100 parts by weight of the aluminum silicates present in the geopolymer.

Such an amount of additive A results in very good processibility of the geopolymer.

In a preferred embodiment, the additive A comprises at least one alkali metal silicate $S_1$. The combination of alkali metal silicate $S_1$ and the water-soluble polymer in the additive A shows a higher plasticizing effect than the water-soluble polymer on its own. Moreover, the alkali metal silicate $S_1$ enables elevated strength of the geopolymer.

Alkali metal silicate is also referred to as waterglass and is a substance of the formula $M_2O * n SiO_2$ where M is Na, K or Li and n is the ratio of $SiO_2$ to $M_2O$. Commercial alkali metal silicates typically have values of n in the range from about 0.5 to 4. Alkali metal silicate dissolved in water is an alkaline, clear, colloidal solution or a gel. The alkali metal silicates also include orthosilicates $M_4O_4Si$ with n=0.5, and metasilicates $M_2O_3Si$ with n=1.

In a preferred embodiment, the alkali metal silicate $S_1$ is a sodium or potassium silicate.

Preference is given to an alkali metal silicate $S_1$ with a molar ratio of $SiO_2$ to $M_2O$ in the range from 0.8 to 3.6, preferably 0.8 to 2, more preferably 0.8 to 1.5, where M is Na and/or K. Such an alkali metal silicate $S_1$ enables an additive A with particularly good storage stability, especially in powder form. Moreover, it shows a particularly good effect as a plasticizer and enables particularly high strength of the hardened geopolymer.

A preferred alkali metal silicate $S_1$ is sodium metasilicate having a ratio of $SiO_2$ to $Na_2O$ of 1.

The suitable amount of alkali metal silicate $S_1$ in the additive A depends on the composition of the geopolymer and the water-soluble polymer and may therefore vary. Preferably, the alkali metal silicate $S_1$ is present in an amount of 10 to 100 parts by weight, more preferably 15 to 80 parts by weight, especially 20 to 60 parts by weight, based on 100 parts by weight of the water-soluble polymer, both calculated in solid form.

The additive A may be in the form of an aqueous solution, of an aqueous suspension, or of a dry or moist powder.

Use as an aqueous solution or aqueous suspension enables simple and good dosage and mixing with the geopolymer. Preference is given to an aqueous solution or suspension having a proportion of dissolved additive A or having a solids content of 25% to 75% by weight, especially 30% to 65% by weight. Such solutions or suspensions can be handled and stored particularly efficiently.

Use in powder form has the advantage that the storage stability of the additive A is particularly good and a particularly low water content in the geopolymer is enabled. A high water content in the geopolymer can result in a reduced strength.

In the form of an aqueous solution, the additive A can be produced in a particularly simple manner. The water-soluble polymer can be dissolved in water or is already in the form of an aqueous solution. If an alkali metal silicate $S_1$ is additionally present, the additive A can be prepared by mixing an aqueous solution of the water-soluble polymer with an aqueous solution of the alkali metal silicate $S_1$ as an aqueous solution, or by dissolving a solid alkali metal silicate $S_1$ in an aqueous solution of the water-soluble polymer.

In powder form, the additive A can especially be prepared in that the water-soluble polymer is in solid form and, if desired, is mixed with solid alkali metal silicate $S_1$, or by drying the additive A in the form of an aqueous solution, for example by freeze-drying or spray drying, optionally with a carrier material, and optionally with subsequent grinding, to obtain a fine powder.

The additive A may comprise further ingredients besides the water-soluble polymer and optionally the alkali metal silicate $S_1$. Suitable further ingredients are especially organic acids or hydroxycarboxylic acids, such as, in particular, adipic acid, succinic acid, maleic acid, tartaric acid, citric acid, salicylic acid or gluconic acid, or alkali metal salts thereof, and also customary cement plasticizers such as, in particular, lignosulfonate, sulfonated melamine condensate, sulfonated naphthalene condensate or polycarboxylate ethers.

In a preferred embodiment, the additive A is an aqueous formulation of
- 20% to 45% by weight of water-soluble polymer as described, especially a sodium salt of polyacrylic acid, having an average molecular weight $M_w$, of 2'000 to 8'000 g/mol,
- 5% to 20% by weight of sodium silicate or potassium silicate having a molar ratio of $SiO_2$ to $M_2O$ of about 0.8 to 2,
- 0% to 5% by weight of further additives and
- 35% to 75% by weight of water, based in each case on the overall aqueous formulation.

In a further preferred embodiment, the additive A is a pulverulent formulation of
- 50% to 90%, preferably 65% to 85%, by weight of water-soluble polymer as described, especially a sodium salt of polyacrylic acid, having an average molecular weight $M_w$, of 2'000 to 8'000 g/mol,
- 10% to 50%, preferably 15% to 35%, by weight of sodium silicate having a molar ratio of $SiO_2$ to $M_2O$ of 1 to about 1.5 and
- 0% to 5% by weight of further solid additives, based in each case on the overall pulverulent formulation.

The additive A is used as plasticizer for geopolymers.

A suitable geopolymer especially consists of
- a powder component comprising at least one aluminum silicate and
- an aqueous component comprising at least one alkali metal silicate $S_2$, which harden after mixing to give a solid body.

Suitable for this purpose are all aluminum silicates with which a geopolymer is producible.

Particularly suitable aluminum silicates are clay, calcined clay, fly ash, blast furnace slag, aluminum slag, zeolite, feldspar or mixtures thereof.

Preferred aluminum silicates are selected from the group consisting of clay, calcined clay, fly ash and blast furnace slag. Among these, preference is given to a mixture comprising fly ash and blast furnace slag, special preference to a mixture of fly ash and/or blast furnace slag with calcined clay, especially metakaolin, particular preference to a mixture of metakaolin with fly ash. The composition of the ingredients of metakaolin varies only slightly from production batch to production batch, which constitutes a particular advantage of these geopolymers. The mixture of metakaolin with fly ash and/or blast furnace slag is of particularly good suitability for the production of geopolymers having high stability and strength.

"Clay" refers to water-containing aluminum silicate which is formed in weathering processes. The clays include kaolinite, bentonite, common clays and kaolinite clays.

"Calcined clay" refers to the reaction product from the calcining of a clay mineral, typically at 600 to 850° C.

"Metakaolin" refers to the amorphous reaction product from the calcining of the clay mineral kaolin, typically at 600 to 850° C. The resultant structure, usually in platelet form, of the metakaolin makes such geopolymers sticky and difficult to process.

Suitable metakaolin is commercially available, for example from Newchem AG, Switzerland.

"Fly ash" refers to a by-product from coal-fired power plants which is filtered out of the waste air in the form of a fine powder. Suitable fly ash is commercially available, for example from BauMineral GmbH, Germany. "Blast furnace slag", also called foundry sand, refers to the nonmetallic by-product in the production of iron, with formation of different types of slag according to the process in the cooling and hardening of the molten material. Blast furnace slag is especially used in the form of fine powder. Suitable blast furnace slag is commercially available, for example from HeidelbergCement AG, Germany.

"Aluminum slag" refers to the waste product obtained in the recovery of aluminum oxide, an intermediate in aluminum production, from aluminum-containing ores, especially bauxite. Aluminum slag is also referred to as red mud.

Preferably, the additive A is used as plasticizer for geopolymers wherein the powder component comprises at least 10% by weight of metakaolin, especially 10% to 60% by weight, based on 100% by weight of the powder component.

The composition of the ingredients in the aluminum silicates obtained as by-products from industries, for example fly ash or slag, often varies significantly from production batch to production batch. The composition of the ingredients of metakaolin varies only slightly from production batch to production batch, which constitutes a particular advantage of geopolymers containing metakaolin.

Geopolymers in which the aluminum silicate in the powder component contains metakaolin only are generally less easy to process than geopolymers containing the same amount of water but in which the aluminum silicate in the powder component also comprises fly ash and/or slag.

Preferably, the powder component of the geopolymer contains not more than 10% by weight, more preferably not more than 5% by weight, of cement or gypsum, based on 100% by weight of aluminum silicate; most preferably, the powder component is free of cement and gypsum.

Especially preferably, the powder component in the geopolymer contains aluminum silicates only.

This increases the storage stability of the powder component of the geopolymer; specifically the water sensitivity is low, and can contribute to better water stability and chemical stability of the geopolymer after curing.

Preferably, the median particle size D50 of the aluminum silicate, calculated as the average value for all aluminum silicates in the powder component, is between 1 μm and 300 μm, more preferably between 2 μm and 250 μm, even more preferably between 3 μm and 200 μm, especially preferably between 5 μm and 150 μm, most preferably between 8 μm and 100 μm, especially preferably between 10 μm and 50 μm, measured by static light scattering in isopropanol and dispersed with the aid of ultrasound.

If the average particle size is less than 1 μm, the amount of water required for good processibility of the geopolymer is distinctly increased. However, high amounts of water reduce the strength and durability of a shaped body produced from the geopolymer after hardening. If the average particle size is greater than 300 μm, the reactivity of the aluminum silicate is low and the geopolymerization is slow and/or incomplete.

Likewise suitable as alkali metal silicate $S_2$ are the already as suitable alkali metal silicates $S_1$ optionally present in the additive A.

Preferably, the alkali metal silicate $S_2$ has a molar ratio of $SiO_2$ to $M_2O$ in the range from 0.8 to 2.4, more preferably of 1.0 to 2.0, especially of 1.4 to 2.0, especially preferably of 1.4 to 1.8. This preferred ratio may have been established by addition of NaOH or KOH, for example.

Preferably, the alkali metal silicate $S_2$ is a potassium silicate and/or sodium silicate, especially a potassium silicate.

It has been found that, surprisingly, geopolymers containing a potassium silicate as alkali metal silicate $S_2$ have much better processibility and are less tough and sticky than geopolymers containing a sodium silicate as alkali metal silicate $S_2$.

Preferably, the alkali metal silicate $S_2$ is a potassium silicate having a ratio of $SiO_2$ to $K_2O$ of 0.8 to 2.4, more preferably of 1.0 to 2.0, especially of 1.4 to 2.0, especially preferably of 1.4 to 1.8.

Geopolymers with such alkali metal silicates have good processibility and harden rapidly.

The invention further provides a composition comprising
  at least one geopolymer comprising a powder component containing at least one aluminum silicate and an aqueous component containing at least one alkali metal silicate $S_2$, and
  a plasticizer comprising the additive A as described above.

The additive A exerts a good plasticizing effect on the geopolymer in the processing of the composition. As a result, the geopolymer can be processed efficiently with a small amount of water, which enables a particularly high strength.

The plasticizer may be present as a constituent of the powder component or as a constituent of the aqueous component of the geopolymer or as a separate component. Preferably, the plasticizer is in the form of a separate component which is mixed with the components of the geopolymer only in the course of processing of the composition.

Geopolymers containing metakaolin are particularly demanding in relation to processing. Such geopolymers are typically comparatively sticky and hence difficult to process, which means that a good plasticizer is particularly important.

Preferably, the powder component of the geopolymer in the composition contains at least 10% by weight of metakaolin, especially 10% to 60% by weight, based on 100% by weight of the powder component.

Preferably, the powder component of the geopolymer in the composition comprises fly ash and/or blast furnace slag, especially fly ash.

More preferably, the powder component of the geopolymer comprises a mixture of metakaolin and fly ash, where the metakaolin component is preferably 10% to 60% by weight, especially 30% to 50% by weight, based on the sum total of metakaolin and fly ash.

Geopolymers containing only fly ash as aluminum silicate have very slow development of strength.

Further preferably, the powder component of the geopolymer comprises a mixture of metakaolin, fly ash and blast furnace slag, where the metakaolin component is 30% to 60% by weight, based on the sum total of metakaolin, fly ash and blast furnace slag.

If blast furnace slag is present in the powder component of the geopolymer, the proportion of blast furnace slag is preferably 20% to 40% by weight, more preferably 25% to 35% by weight, based on 100% by weight of the sum total of all aluminum silicates in the powder component.

Likewise suitable as alkali metal silicate $S_2$ are the alkali metal silicates $S_1$ already mentioned as suitable.

Preferably, the alkali metal silicate $S_2$ has a molar ratio of $SiO_2$ to $M_2O$ in the range from 0.8 to 2.4, preferably of 1.0 to 2.0, especially of 1.4 to 2.0, especially preferably of 1.4 to 1.8. This preferred ratio may have been established by addition of NaOH or KOH, for example. If the ratio of $SiO_2$ to $M_2O$ is in the region of 0.8 or lower, the processing time of the geopolymer can be very short and the geopolymer is highly alkaline, which constitutes an elevated safety risk to the user. If the ratio of $SiO_2$ to $M_2O$ is higher than 2.4, the geopolymerization reaction is very slow, especially when the hardening is effected without supply of heat, and so shaped bodies produced are often still not solid even after 24 hours.

Preferably, the alkali metal silicate $S_2$ is a potassium silicate and/or sodium silicate, especially a potassium silicate.

Preferably, the aqueous component of the geopolymer contains 30% to 50% by weight of alkali metal silicate $S_2$.

In a particularly preferred embodiment of the invention, if the additive A comprises an alkali metal silicate $S_1$, this alkali metal silicate $S_1$ and the alkali metal silicate $S_2$ in the aqueous component of the geopolymer are different in relation to the alkali metal present. Preferably, the alkali metal silicate $S_1$ present is a sodium silicate and the alkali metal $S_2$ present is a potassium silicate. Such a composition shows particularly good processibility and strength after hardening.

The composition may consist solely of geopolymer and the additive A and be used as such for injections, for example, or it may comprise further ingredients. Preferably, the composition additionally comprises sand and/or gravel and/or further additives. Such a composition is particularly suitable as mortar, concrete, render, grout or coating.

The plasticizer here is especially present in such an amount that there are 2 to 7 parts by weight of plasticizer, calculated in solid form, per 100 parts by weight of the powder component of the geopolymer.

The composition is processed by mixing all the components of the composition together. More particularly, the powder component and the aqueous component of the geopolymer and the plasticizer are simultaneously mixed with one another, or the powder component and the aqueous component of the geopolymer are first mixed with one another, and the plasticizer is added to the mixed geopolymer immediately thereafter and mixed in well.

Preferably, the plasticizer is present as a separate component and is mixed into the freshly mixed components of the geopolymer. This mode of processing enables particularly good plasticization.

The mixing of the components of the geopolymer is preferably effected with a mixing tool customary in mortar production. Especially intensive mixing or additional grinding of the components is not advantageous for the processing and use of the geopolymer. Excessively long and excessively intensive mixing costs time and energy, undesirably increases the input of air into the mixture and can hinder the geopolymerization reaction.

The mixing time of the geopolymer is preferably not more than 6 minutes, more preferably not more than 5 minutes, even more preferably not more than 4 minutes, especially preferably not more than 3 minutes.

The mixed composition is converted to the desired shape, suitably within the period of time within which it has good formability.

The contact of the powder component with the aqueous component commences the hardening of the geopolymer by chemical reaction. This forms Si—O—Al—O bonds with formation of a three-dimensional inorganic polymer structure, which ultimately results in hardening of the mass to give a solid. The hardening of the composition typically proceeds at temperatures of 10 to 120° C. Preference is given to hardening at ambient temperature, especially at a temperature in the range from 20 to 35° C.

The invention further provides a process for producing a shaped body, comprising the steps of
  providing the composition comprising at least one geopolymer and at least one plasticizer as described above,
  mixing the components of the composition,
  applying the composition,
  hardening the composition.

The shaped body here especially has a three-dimensional shape.

This process is used to obtain an article comprising the hardened composition. The invention further provides such an article.

The shaped body or the article preferably constitutes a component of a building or a built structure, especially a shell, a wall, a floor, a coating, a screed or a filling.

EXAMPLES

Working examples are adduced hereinafter, which are intended to elucidate the invention described in detail. It will be appreciated that the invention is not restricted to these described working examples.

"GP" stands for "geopolymer mixture".
"Ref." stands for "reference example".
"Ex." stands for "example".
Description of Test Methods
The solids content of the solutions was determined with a halogen drier from Mettler Toledo.
The $SiO_2$, $Na_2O$ and $K_2O$ contents and the alkali metal silicate content of the alkali metal silicate solutions were taken from the manufacturers' datasheets.
The average molecular weight $M_w$ of the polymers was determined by means of gel permeation chromatography (GPC).
GPC Measurement Conditions
  Columns: PSS Suprema 10 μm, 2×1000 Å, 1×30 Å, all 8×300 mm with precolumn, from PSS Polymer Standards Service, Germany
  Eluent: 0.1N $NaNO_3$ adjusted to pH 12 with NaOH
  Flow rate: 0.8 mL/min
  Temperature (column oven and detector): 45° C.
  In-line degasser AF, Waters
  Pump: Varian Pro Star Model 220
  Detector: Waters 2414 RI detector
  Standards: polymethacrylic acid sodium salt $M_w$ 1'220, 3'180, 8'210, 34'900, 163'000 from PSS Polymer Standards Service
  Concentration of the standards, dissolved in the eluent: 1 mg/mL
  Concentration of the samples calculated in solid form, dissolved in the eluent: 10 mg/mL
  Evaluation software: Breeze™ 2, Waters The Compositions were Tested as Follows:
Slump was determined to EN 1015-3. The values in the tables are based on the diameter of the mortar directly after the raising of the slump cone and awaiting the end of the flow movement without lifts of the flow table. Slump serves as a measure of the flowability of the composition, a high slump showing high flowability of the composition or a good effect of the plasticizer present. Slump was determined immediately and, if appropriate, after 10, 20, 30 and 45 minutes after the mixing of the mortar.

For the determination of compressive strength of the hardened compositions, prisms of 4×4×16 cm were produced, demolded after 24 hours and stored at 20° C. and 65% relative air humidity and tested to EN 196-1.

Materials Used
Metaver® R, metakaolin, Newchem, Switzerland
Metastar™ 501, metakaolin, Imerys, USA
EFA®-Füller, fly ash, BauMineral, Germany
SH 20 foundry sand, blast furnace slag, HeidelbergCement, Germany
Untervaz foundry sand, blast furnace slag, Holcim, Switzerland
WG-1: aqueous potassium silicate solution having an alkali metal silicate content of 41% by weight and a molar $SiO_2/K_2O$ ratio of 3.
WG-2: aqueous potassium silicate solution having an alkali metal silicate content of 48% by weight and a molar $SiO_2/K_2O$ ratio of 1.
WG-3: aqueous potassium silicate solution having an alkali metal silicate content of 30% by weight and a molar $SiO_2/K_2O$ ratio of 2.
WG-4: aqueous potassium silicate solution having an alkali metal silicate content of 45% by weight and a molar $SiO_2/K_2O$ ratio of 1.5.
WG-5: aqueous sodium silicate solution having an alkali metal silicate content of 42.6% by weight and a molar $SiO_2/K_2O$ ratio of 1.5.
NaMS: sodium metasilicate pentahydrate, Sigma Aldrich, Switzerland.
PA-15: Sokalan® PA 15 (from BASF), polyacrylic acid sodium salt, $M_w$=2'400 g/mol, solids content of the aqueous solution 45% by weight, pH (10% solution) 8.
PA-25: Sokalan® PA 25 XS (from BASF), polyacrylic acid, $M_w$=4'000 g/mol, solids content of the aqueous solution 49% by weight, pH 2.8.
PA-40: Sokalan® PA 40 (from BASF), polyacrylic acid sodium salt, $M_w$=14'500 g/mol, solids content of the aqueous solution 35% by weight, pH 7.
PA-70: Sokalan® PA 70 PN (from BASF), polyacrylic acid sodium salt, $M_w$=43'800 g/mol, solids content of the aqueous solution 30% by weight, pH 5.
PA-80: Sokalan® PA 80 S (from BASF), polyacrylic acid, $M_w$, =79'500 g/mol, solids content of the aqueous solution 35% by weight, pH (10% solution) 2.
Dolapix SPC 7 (from Zschimmer & Schwarz Chemische Fabriken), dispersant and plasticizer, aqueous solution having a solids content of 52% by weight, containing a water-soluble polymer having carboxyl groups having an average molecular weight $M_w$ of 3'200 g/mol and a sodium silicate, pH 13, specimen from 2013.
Quartz sand: Quarzwerke Austria, Austria.
In the assessment of the results in tables 1 to 7, it is important to take into account that the geopolymer composition, for every new batch of metakaolin and fly ash, owing to variations in the composition of these raw materials, particularly of the fly ash, had altered properties and in some cases had to be adjusted. This adjustment was made by slight variation in the amount of alkali metal silicate and in the amount of KOH. Within a test series, the same geopolymer composition was used in each case with identical batches of metakaolin and fly ash. This explains the different values of Ref. 1, Ref. 12 and Ref. 13.

Test Series 1—Workability and Hardening of Geopolymers Composed of Metakaolin and Fly Ash Metaver® R and EFA® Füller HP were introduced into a forced mixer from Hobart in the amounts specified in table 1 and the powder was mixed at level 1 for 1 minute. Within 30 seconds, while stirring at level 1, 348 g of WG-4 and 10 g of water were added. Mixing was continued at level 1 for a further 30 seconds and then at level 2 for a further 2 minutes. If the geopolymer was not homogeneous enough after these 3 minutes of mixing time of the wet mixture, mixing was continued until the mixture was homogeneous, but for not more than 8 minutes. Subsequently, the slump of each composition was determined. The results are reported in table 1.

TABLE 1

|  | GP 1[1)] | GP 2[2)] | GP 3[2)] | GP 4[2)] | GP 5 | GP 6 | GP 7 |
|---|---|---|---|---|---|---|---|
| Metaver® R [g] | 864 | 785.5 | 576 | 518.4 | 259.5 | 86.4 | 0 |
| EFA®-Füller [g] | 0 | 78.5 | 288 | 345.6 | 604.5 | 777.6 | 864 |
| Metakaolin to fly ash [parts by weight] | 1:0 | 10:1 | 2:1 | 1.5:1 | 1:2.3 | 1:9 | 0:1 |
| Slump [mm] |  |  |  |  |  |  |  |
| immediate | n.m.[3)] | n.m.[3)] | n.d.[4)] | n.d.[4)] | 229 | 290 | 278 |
| 10 min. | n.m.[3)] | n.m.[3)] | 146 | 154 | 246 | 297 | 288 |
| 20 min. | n.m.[3] | n.m.[3] | 175 | 182 | 254 | 293 | 288 |
| 30 min. | n.m.[3)] | n.m.[3)] | 185 | 195 | 265 | 293 | 286 |
| 45 min. | n.m.[3)] | n.m.[3)] | 162 | 198 | 268 | 279 | 278 |
| Solid after 24 hours | yes | yes | yes | yes | yes | yes | no |

[1)] mixing time 8 minutes
[2)] mixing time 5 minutes
[3)] not measurable, too tough and sticky
[4)] measurement not made owing to prolonged mixing time Test Series 2—Workability of Geopolymers with Sodium Silicate/Potassium Silicate 259.5 g of Metaver® R and 604.5 g of EFA® Füller HP were mixed in a forced mixer from Hobart at level 1 for 1 minute. Within 30 seconds, with continued stirring, the waterglass (WG-4 or WG-5) and the water according to table 2 were added. Mixing was continued at level 1 for a further 30 seconds and then at level 2 for a further 2 minutes. If the geopolymer was not homogeneous enough after these 3 minutes of mixing time of the wet mixture, mixing was continued until the mixture was homogeneous, but for not more than 8 minutes. Subsequently, the slump of each composition was determined. The results are reported in table 2.

TABLE 2

|  | GP 5 | GP 8[1)] |
|---|---|---|
| WG-4 [g] | 348 | 0 |
| WG-5 [g] | 0 | 348 |
| Water [g] | 10 | 1.5 |
| Total water in the geopolymer [g] | 201 | 201 |
| Slump [mm] |  |  |
| immediate | 229 | n.d.[2)] |
| 10 min. | 246 | 134 |
| 20 min. | 254 | n.m.[3)] |
| 30 min. | 265 | n.m.[3)] |
| 45 min. | 268 | n.m.[3)] |
| Compressive strength after 24 hours [MPa] | 23.0 | 17.4 |

[1)] mixing time 5 minutes
[2)] measurement not made owing to prolonged mixing time
[3)] not measurable, too tough and sticky Test Series 3—Test of Plasticizing Action of Commercial Plasticizers for Cement and Gypsum in Comparison 329 g (21.9 parts by weight) of Metaver® R and 767 g (51.1 parts by weight) of EFA® Füller HP were mixed in a forced mixer from Hobart at level 1 for 1 minute. Within 30 seconds, with continued stirring, a solution of 348 g (23.2 parts by weight) of WG-1 and 56 g (3.7 parts by weight) of a 50% by weight aqueous KOH solution was added. Within a further 30 seconds, the plasticizer according to table 3 was added in the dosage specified and the composition was mixed at level 2 for a further 2 to 3 minutes. Subsequently, the slump of each composition was determined. The results are reported in table 3.

TABLE 3

|  |  |  | Slump [mm] | | |
|---|---|---|---|---|---|
| | Plasticizer | Dosage [1)] | immediate | 20 min. | 45 min. |
| Ref. 1 | none | 0 | 178 | 166 | 140 |
| Ref. 2 | Ultrazine NAS [2)] | 0.75 | 115 | 108 | np [6)] |
| Ref. 3 | Ultrazine NAS [2)] | 1.5 | 100 | np [6)] | np [6)] |
| Ref. 4 | Ultrazine NAS [2)] | 3.0 | np [6)] | np [6)] | np [6)] |
| Ref. 5 | Borrement CA 120 [3)] | 1.5 | 100 | np [6)] | np [6)] |
| Ref. 6 | Borrement CA 120 [3)] | 3.0 | np [6)] | np [6)] | np [6)] |
| Ref. 7 | Sikament® FF-86 [4)] | 3.0 | 100 | np [6)] | np [6)] |
| Ref. 8 | Na gluconate | 0.1 | 187 | 123 | 108 |
| Ref. 9 | Sika® ViscoCrete® 120P [5)] | 1.5 | 100 | np [6)] | np [6)] |
| Ref. 10 | Sika® ViscoCrete® 120P [5)] | 3.0 | 100 | np [6)] | np [6))] |

[1)] parts by weight of solids per 100 parts by weight of geopolymer
[2)] Na lignosulfonate powder (from Borregaard)
[3)] Ca lignosulfonate powder (from Borregaard)
[4)] sulfonated melamine condensate powder (from Sika)
[5)] polycarboxylate ether powder (from Sika)
[6)] not processible (too stiff)

Test Series 4—Test of Plasticizing Action of Polyacrylic Acid and Mixtures of Polyacrylic Acid with Alkali metal Silicate A geopolymer was prepared analogously to test series 3.

Added to this geopolymer in each case was the plasticizer specified in table 4 in the dosage specified, and the slump of the composition was determined as described for test series 3.

The Plasticizers used were Produced as Follows:

PA-25 pH 2.8: PA-25 was diluted with water to a solids content of 37.7% by weight.

PA-25 pH 8: PA-25 was adjusted to a pH of 8 by addition of NaOH and the solids content was adjusted to 37.7% by weight by addition of water.

For ex. 4 to ex. 6, according to table 4, the amount of sodium metasilicate pentahydrate (NaMS) specified was mixed with the amount of PA-25 pH 8 specified, and this mixture was used as plasticizer.

TABLE 4

| | | | Slump [mm] | |
|---|---|---|---|---|
| Plasticizer | Dosage | immediate | 20 min. | 45 min. |
| Ref. 11 | PA-25 pH 2.8 | 3.0 [1] | np [3] | np [3] | np [3] |
| Ex. 1 | PA-25 pH 8 | 2.0 [1] | 213 | 206 | 177 |
| Ex. 2 | PA-25 pH 8 | 3.0 [1] | 211 | 204 | 167 |
| Ex. 3 | PA-25 pH 8 | 5.0 [1] | 186 | 172 | 136 |
| Ex. 4 | PA-25 pH 8 NaMS | 3.0 [1] 7.0 [2] | 226 | 229 | 214 |
| Ex. 5 | PA-25 pH 8 NaMS | 3.0 [1] 10.3 [2] | 237 | 237 | 221 |
| Ex. 6 | PA-25 pH 8 NaMS | 3.0 [1] 17.2 [2] | 252 | 263 | 242 |
| Ex. 7 | Dolapix SPC 7 | 2.0 [1] | 233 | 228 | 210 |
| Ex. 8 | Dolapix SPC 7 | 3.0 [1] | 252 | 247 | 232 |

[1] parts by weight of solids per 100 parts by weight of powder component (metakaolin and fly ash) of the geopolymer
[2] parts by weight of NaMS per 100 parts by weight of PA-25 pH 8 solution
[3] not processable (too stiff and sticky)

Test Series 5—Test of Plasticizing Action of Polyacrylic Acid and Mixtures of Polyacrylic Acid with Alkali Metal Silicate A geopolymer having the following composition was prepared analogously to test series 3:
21.6 parts by weight of Metaver® R
50.4 parts by weight of EFA® Füller HP
21.2 parts by weight of WG-1
6.8 parts by weight of KOH (50% aqueous solution)

Added to this geopolymer in each case was the plasticizer specified in table 5, and the slump of the composition was determined as described for test series 3.

The Plasticizers used were Produced as Follows:

The respective polyacrylic acid solution was adjusted to pH 13 by addition of NaOH and used as such in examples 9 to 12. In examples 13 to 16, 17.2 g of sodium metasilicate pentahydrate (NaMS) in each case, based on 100 g of the polyacrylic acid solution, were also mixed into the polyacrylic acid solutions of pH 13.

The plasticizers used were dosed such that 3.0 parts by weight of polyacrylic acid solids were present per 100 parts by weight of powder component (metakaolin and fly ash) of the geopolymer.

TABLE 5

| | | SC [1] | Slump [mm] | | |
|---|---|---|---|---|---|
| Plasticizer | | % by wt. | 5 min. | 20 min. | 45 min. |
| Ref. 12 | none | | 220 | 226 | 224 |
| Ex. 9 | PA-15 pH 13 | 45 | 250 | 260 | 265 |
| Ex. 10 | PA-25 pH 13 | 37 | 255 | 250 | 251 |
| Ex. 11 | PA-40 pH 13 | 35 | 235 | 228 | 214 |
| Ex. 12 | PA-70 pH 13 | 30 | 235 | 230 | 214 |
| Ex. 13 | PA-15 pH 13 with NaMS | 45 | 256 | 270 | 278 |
| Ex. 14 | PA-25 pH 13 with NaMS | 37 | 268 | 269 | 269 |
| Ex. 15 | PA-40 pH 13 with NaMS | 35 | 247 | 238 | 225 |
| Ex. 16 | PA-70 pH 13 with NaMS | 30 | 248 | 242 | 227 |

[1] solids content of the polyacrylic acid solution of pH 13

Test Series 6—Test of the Effect of Polyacrylic Acid and Mixtures of Polyacrylic Acid with Alkali Metal Silicate on Flow Characteristics and Development of Strength A geopolymer having the following composition was prepared analogously to test series 3:
21.6 parts by weight of Metaver® R
50.4 parts by weight of EFA® Füller HP
21.2 parts by weight of WG-1
3.4 parts by weight of KOH powder In the case of this geopolymer, KOH in powder form was dissolved in WG-1.

For the reference mixture Ref. 13 and examples 17 and 18, 3.4 parts by weight of water were also added. For examples 19 to 22, only 1.6 parts by weight of water were added, in order to compensate for the amount of water that was introduced by the alkali metal silicate solution in the plasticizer.

Added to the geopolymer in each case was the plasticizer specified in table 6 as described for test series 3, and the slump and compressive strength of the composition were determined.

The Plasticizers used were Produced as Follows:

The respective polyacrylic acid solution was brought to a pH of 13 by addition of NaOH and the solids content was adjusted to 31% by weight by adding water, and it was used as such for examples 17 and 18. For examples 19 to 22, a sufficient amount of alkali metal silicate solution, WG-2 or WG-3 according to table 6 was mixed into the polyacrylic acid solutions of pH 13 and solids content 31% by weight that an amount of 11.2 parts by weight of solid alkali metal silicate based on 100 parts by weight of polyacrylic acid solution was present.

The plasticizers used were dosed such that 3 parts by weight of polyacrylic acid solids were present per 100 parts by weight of powder component (metakaolin and fly ash) of the geopolymer.

TABLE 6

| | | Slump [mm] | | | Compressive strength [MPa] | | |
|---|---|---|---|---|---|---|---|
| Plasticizer | | 5 min. | 20 min. | 45 min. | 24 hours | 7 days | 28 days |
| Ref. 13 | none | 194 | 216 | 213 | —[1] | —[1] | —[1] |
| Ex. 17 | PA-15[2] | 300 | 302 | 301 | 7.7 | 19.7 | 28.0 |
| Ex. 18 | PA-25[2] | 271 | 274 | 274 | 9.8 | 18.2 | 27.5 |
| Ex. 19 | PA-15[2] with WG-2 | 305 | 310 | 314 | 9.3 | 21.5 | 29.3 |
| Ex. 20 | PA-25[2] with WG-2 | 278 | 286 | 290 | 11.2 | 20.9 | 31.6 |
| Ex. 21 | PA-15[2] with WG-3 | 308 | 317 | 310 | 10.1 | 19.8 | 30.3 |
| Ex. 22 | PA-25[2] with WG-3 | 277 | 278 | 280 | 9.3 | 20.0 | 28.7 |

[1] not measured
[2] aqueous solution of pH 13 with solids content 31% by weight Test Series 7—Test of the Effect of a Mixture of Polyacrylic Acid with Alkali Metal Silicate on Flow Characteristics and Development of Strength 440 g of Metaver® R, 440 g of Metastar™ 501, 240 g of EFA® Füller HP, 240 g of SH20 foundry sand, 240 g of Untervaz foundry sand, 197 g of 0.06-0.3 mm quartz sand, 265 g of 0.1-0.6 mm quartz sand, 348 g of 0.3-0.9 mm quartz sand, 386 g of 0.7-1.2 mm quartz sand, 513 g of 1.5-2.2 mm quartz sand and 688 g of 2.0-3.2 mm quartz sand were mixed in a Hobart forced mixer at level 1 for 1 minute. Within 30 seconds, with continued stirring, 1120 g of WG-4 were added. Within a further 30 seconds, the plasticizer according to table 7 was added in the dosage specified and the composition was mixed at level 2 for a further 2 to 3 minutes. Subsequently, the slump of the composition was determined. The results are reported in table 7.

TABLE 7

| | Plasticizer | Slump [mm] | | | | Compressive strength [MPa] |
| --- | --- | --- | --- | --- | --- | --- |
| | | immediate | 10 min. | 20 min | 30 min | 7 days |
| Ref. 14 | none | 248 | 262 | 247 | n.p[1)] | 57.4 |
| Ex. 23 | 106.7 g Dolapix SPC 7 | 260 | 278 | 287 | 245 | 57.5 |

[1)]not processible

The invention claimed is:

1. A method comprising
 plasticizing at least one geopolymer that comprises a powder component that comprises at least 10% by weight of metakaolin, based on 100% by weight of the powder component, wherein the plasticizing includes combining an additive A with the at least one geopolymer, the additive comprising
  at least one water-soluble polymer which is a homo- or copolymer consisting of repeating units that are formed from at least one monoethylenically unsaturated carboxylic acid that has been partly or fully neutralized with an alkali metal ion, wherein the at least one monoethylenically unsaturated carboxylic acid is selected from acrylic acid, methacrylic acid, maleic acid, maleic anhydride, fumaric acid, crotonic acid, or itaconic acid, and optionally at least one further co-monomer that is selected from allyl alcohol, ethylene, propylene, vinylsulfonic acid, methallylsulfonic acid, acrylamido-2-methylpropanesulfonic acid, acrylamide, alkyl esters of methacrylic acid, or hydroxyalkyl esters of methacrylic acid, and
  at least one alkali metal silicate $S_1$,
  wherein the alkali metal silicate $S_1$ is present in an amount of 10 to 100 parts by weight, based on 100 parts by weight of the water-soluble polymer, both calculated in solid form.

2. The method as claimed in claim 1, wherein the water-soluble polymer is a homopolymer of acrylic acid or a copolymer consisting of repeating units that are formed from acrylic acid and the at least one further co-monomer.

3. The method as claimed in claim 1, wherein the water-soluble polymer has an average molecular weight $M_w$ in the range from 1,000 to 20,000 g/mol.

4. The method as claimed in claim 1, wherein the water-soluble polymer is a homopolymer of acrylic acid in the form of the sodium salt and having an average molecular weight $M_w$ in the range from 2,000 to 8,000 g/mol.

5. The method as claimed in claim 1, wherein the at least one alkali metal silicate $S_1$ has a molar ratio of $SiO_2$ to $M_2O$ in the range from 0.8 to 3.6, where M is Na and/or K.

6. The method as claimed in claim 1, wherein the additive A is in the form of an aqueous solution, an aqueous suspension, or a dry or moist powder.

7. The method as claimed in claim 1, wherein the powder component comprises 10% to 60% by weight of metakaolin, based on 100% by weight of the powder component.

8. The method as claimed in claim 1, wherein the powder component of the at least one geopolymer further comprises fly ash and/or blast furnace slag.

9. The method as claimed in claim 1, wherein the at least one geopolymer comprises an aqueous component containing at least one alkali metal silicate S2.

10. The method as claimed in claim 9, wherein the alkali metal silicate S2 is a potassium silicate.

* * * * *